United States Patent [19]

Powell, Jr.

[11] Patent Number: 5,086,909

[45] Date of Patent: Feb. 11, 1992

[54] GENTLE HANDLING OF FRUIT DURING WEIGHT SIZING AND OTHER OPERATIONS

[75] Inventor: Harry C. Powell, Jr., Faber, Va.

[73] Assignee: Powell Machinery, Inc., Faber, Va.

[21] Appl. No.: 374,827

[22] Filed: Jul. 3, 1989

Related U.S. Application Data

[63] Continuation-in-part of Ser. No. 248,199, Sep. 23, 1988, Pat. No. 4,957,619.

[51] Int. Cl.$^5$ .............................................. B65G 47/19
[52] U.S. Cl. ..................................... 198/534; 198/635
[58] Field of Search ...................... 198/525, 534, 699.1, 198/688.1, 690.2, 635, 723

[56] References Cited

U.S. PATENT DOCUMENTS

| | | | |
|---|---|---|---|
| 3,272,309 | 9/1966 | Reading | 198/723 X |
| 4,036,355 | 7/1977 | Valli | 198/699.1 X |
| 4,172,516 | 10/1979 | Curl et al. | 198/635 |
| 4,262,807 | 4/1981 | Leverett | 209/592 |
| 4,595,091 | 6/1986 | Scopatz et al. | 198/372 |
| 4,836,355 | 6/1989 | Blanc | 198/534 X |

FOREIGN PATENT DOCUMENTS

| | | | |
|---|---|---|---|
| 2418758 | 11/1979 | France | 198/534 |
| 1031334 | 6/1966 | United Kingdom | 198/690.2 |

Primary Examiner—D. Glenn Dayoan
Attorney, Agent, or Firm—Nixon & Vanderhye

[57] ABSTRACT

Bruisable articles, such as pieces of fruit like apples, are singulated, sorted according to property (e.g., weight), and discharged with a minimum of bruising, even if the fruit is not treated with ALAR (diminozide). The cups for holding the fruit are continuously conveyed by conveying chains, and have larger, more steeply angled front and rear surfaces (in the direction of conveyance) than side surfaces so that the fruit will be held in place during conveyance but can be relatively easily discharged when the cup is tilted at a discharge station. Self-singulating is accomplished utilizing conveyors on either side of the row of cups, an overhead rotating brush, and elongated brush strips. The brushes of the brush strips gently engage the fruit and urge it into position within a cup. At the discharge section, a brush having polyethylene bristles of about 4-6 inches in length is rotated with a tangential velocity approximately equal to the velocity in the direction of conveyance of the fruit by the cups at the discharge area. The fruit falls into the brush bristles and is cushioned as it enters them, and it is discharged at a different level on another conveyor moving in a different direction.

17 Claims, 10 Drawing Sheets

FIG. 11
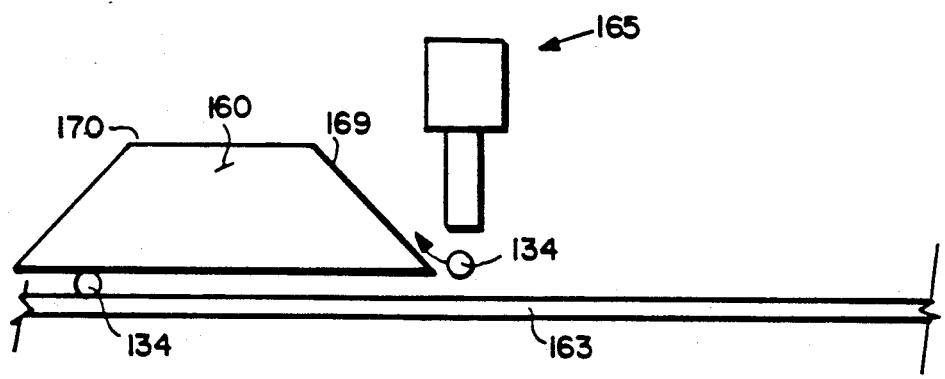
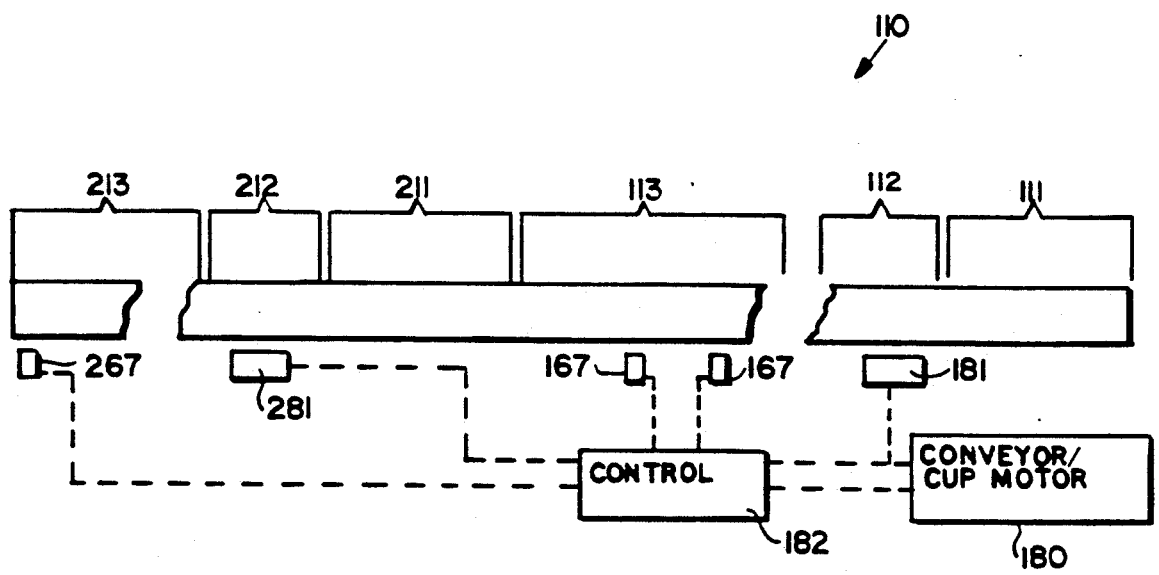
FIG. 13

GENTLE HANDLING OF FRUIT DURING WEIGHT SIZING AND OTHER OPERATIONS

RELATED APPLICATIONS

This application is a continuation-in-part of application Ser. No. 07/248,199, filed Sept. 23, 1988 now U.S. Pat. No. 4,957,619.

BACKGROUND AND SUMMARY OF THE INVENTION

In the design of equipment for sorting discrete bruisable articles, particularly for sorting pieces of fruit (e.g. apples or pears) by weight, color, or other property, additional care is being taken to handle the fruit gently so as to reduce bruising. While prior art sorters, such as disclosed in U.S. Pat. Nos. 4,595,091 and 4,262,807 do not necessarily handle the fruit roughly, there is a perception in the trade that the fruit should be handled more gently and therefore manufacturers of fruit sorting equipment are attempting to respond to this perception. This is especially so since fewer and fewer packers are using ALAR (diminozide) to treat the fruit. ALAR gives the fruit additional toughness and protection against bruising, and if not utilized, gentler handling is desirable.

The two major areas where bruising can occur in conventional article sorting equipment are in the transfer of the pieces of fruit from a singulating mechanism to the conveyance cups (which then subsequently pass over a load cell or the like), and in the discharge of the pieces of fruit at a discharge section. Often the discharge is handled so that the piece of fruit is discharged in the direction of conveyance so that it has a large velocity component in that direction. It is more desirable so as to minimize bruising to discharge the article without a significant velocity component in the direction of conveyance by moving it generally perpendicular to the direction of conveyance. While there have been a number of procedures for effecting this in the past, such as shown in U.S. Pat. Nos. 4,595,091 and 4,586,613, oftentimes a larger discharge force than desirable has been imparted to the article either due to impacting of the article with a sidewardly moving element, or because the angle of tilt necessary to discharge the article was relatively large (e.g. more than about 30°).

According to the present invention, an article sorting apparatus and method are provided which seek to minimize the bruising of fruit during sorting thereof according to fruit property (particularly weight, but also possibly color, or other property thereof) while providing a simple and economical arrangement.

The apparatus according to the invention includes a continuous conveying chain elongated in a dimension of elongation with a plurality of discrete article supporting elements (cups) connected to the chain for linear movement with it, and for pivotal movement with respect to the chain about an axis generally parallel to the dimension of elongation. A plurality of stations are provided for the continuous conveying chain and article supporting elements, including a self-singulating section in which the articles are singulated onto the supporting elements, an article property determining section through which the articles are carried by the supporting elements and properties thereof sensed, and a discharge section in which the articles are selectively discharged at a plurality of spaced distinct locations depending upon the properties thereof sensed in the article property determining section. The self-singulating section may comprise a pair of elongated strip brushes, one mounted on either side of the conveying cups (article supporting elements). The strip brushes are mounted so that they are disposed at an angle with respect to the linear direction of movement of the conveying cup so as to facilitate gentle individual movement of apples or like discrete bruisable objects into the cups. The strip brushes preferably comprise brushes having synthetic material bristles with an unsupported length of about ½ inch-1¼ inches (e.g., about 1 inch), the synthetic material preferably being nylon.

The supporting elements preferably comprise plastic cups, each having a shallow depression on a top face. The depression is deep enough to positively hold the article for property determination and conveyance, but shallow enough so that the cup need be tilted only a small amount about its axis to effect discharge with minimal bruising; e.g. a generally conically shaped depression may be provided. The depression is provided between front, rear, and two side edges. The front and rear edges are longer than the side edges, and the depression has an effective greater angle of inclination at at least a portion thereof from the bottom to the front and rear edges than from the bottom to the side edges. For example, the effective angle of inclination with regard to the front and rear edges is about 30°, while with respect to the side edges is about 20°. In this way, the apples are more positively held in place in the direction of conveyance than they are in the direction perpendicular to the direction of conveyance (that is, the direction of discharge).

The individual conveying cups of the apparatus according to the invention, which are connectable to the transporting chain, are made of two different plastic bodies. A first body is of a first plastic material, such as Delrin or UHMW, which has dimensional stability, and includes a means for connecting the body to a transporting chain. The second body is of a second plastic which need not have dimensional stability, and is of less expensive and softer material than the first material (e.g., EVA). The second body is connected to the first body and extends therefrom in a dimension opposite the connecting means, and has an exterior contour for holding an apple or like discrete bruisable element so that it will not inadvertently move out of the body. The cup also preferably comprises a trip tab integral with the first body and of the first material and extending downwardly from the first body, oppositely to the portion thereof to which the second body is connected. The cup according to the invention may be constructed by injection molding wherein the first body is injection molded in a first mold, the first body is then inserted in a second mold, and the second body is formed in the second mold, around the first body so that the first body holds it in place. The formed cup is remove from the second mold, and it is cooled. The first body is formed so that after it cools due to the natural warpage thereof, the first body holds the second body more securely than prior to natural warpage.

The invention also comprises a bruisable discrete element transfer mechanism. This mechanism comprises: a first transporting means for transporting the bruisable element in a first direction at a first level; a second transporting means for transporting the bruisable element in a second direction and/or second level, different than said first direction and/or level; a brush having a shaft rotatable about an axis, and adjacent the first transporting means, and having bristles extending from the shaft positioned adjacent the first level; means for rotating the shaft so that the brush bristles have a tangential direction of movement adjacent the first level in the first direction; and means for moving the bruisable element from the first transporting means to the brush so that the bruisable element is engulfed by the brush bristles and moves through the bristles toward the shaft so that the brush transfers the bruisable element from the first transporting means to the second transporting means. The bristles preferably have a length of about 4–6 inches, and frayed ends, and are of polyethylene. The axis of rotation of the brush shaft is substantially horizontal, and the second direction and level are both different than the first direction and level. The second level is preferably below the first level by a distance approximately equal to the radius of the brush. Finger means extend into the brush bristles at approximately the second level for stripping the bruisable element from the brush and facilitating deposit thereof in operative association with the second transporting means.

The invention further contemplates a method of handling bruisable articles, such as pieces of fruit without diminozide, to minimize the bruising action of handling. The method comprises the steps of: (a) While continuously conveying the pieces of fruit in a direction of conveyance, sequentially (a1) singulating, (a2) weighing, and (a3) selectively discharging the pieces depending upon the weights thereof, utilizing a continuous mechanism so that there is no necessity for transferring the pieces from one conveyance mechanism to another. And, (b) practicing said step (a3) by discharging the pieces of fruit so that the velocity component in the direction of conveyance is gradually and gently reduced after discharge to a low level, and then the pieces are carried away in a direction generally perpendicular to the direction of conveyance.

It is the primary object of the present invention to provide for the simple and effective sorting of discrete bruisable articles, such as pieces of fruit not treated with diminozide, with a minimum of bruising. This and other objects of the invention will become clear from an inspection of the detailed description of the invention, and from the appended claims.

BRIEF DESCRIPTION OF THE DRAWINGS

FIG. 11 is a side view of an alternative embodiment of deflecting means from that illustrated in FIGS. 9 and 10;

FIG. 13 is a schematic view of a second embodiment of apparatus according to the invention.

DETAILED DESCRIPTION OF THE DRAWINGS

Figure 12:
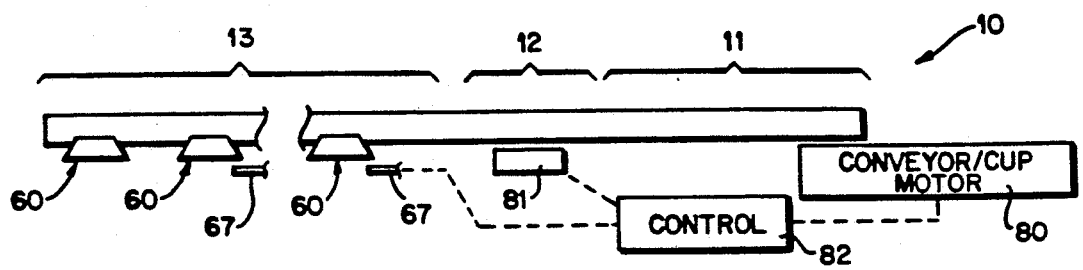
FIG. 12 is a schematic view of exemplary apparatus according to the invention.

With reference to FIG. 12, the basic sections of an article sorter for sorting discrete bruisable articles, such as pieces of fruit (apples, pears, etc.) is schematically illustrated by reference numeral 10. The apparatus includes a loading, self-singulating section 11, a weighing or other article property determining section 12, and a discharge, sorting section 13. The basic elements that extend throughout the sections 11 through 13 comprise a plurality of discrete article supporting elements (e.g. cups) 15 movable in a linear dimension 16, and connected to a chain 17 (e.g. see FIGS. 2 and 4) for movement in the direction 16, the chain 17 elongated in the dimension 16. The chain 17 is connected up to conventional sprockets, motors, and the like for continuously moving the chain, the details of which are standard and not per se a part of this invention.

Figure 1:
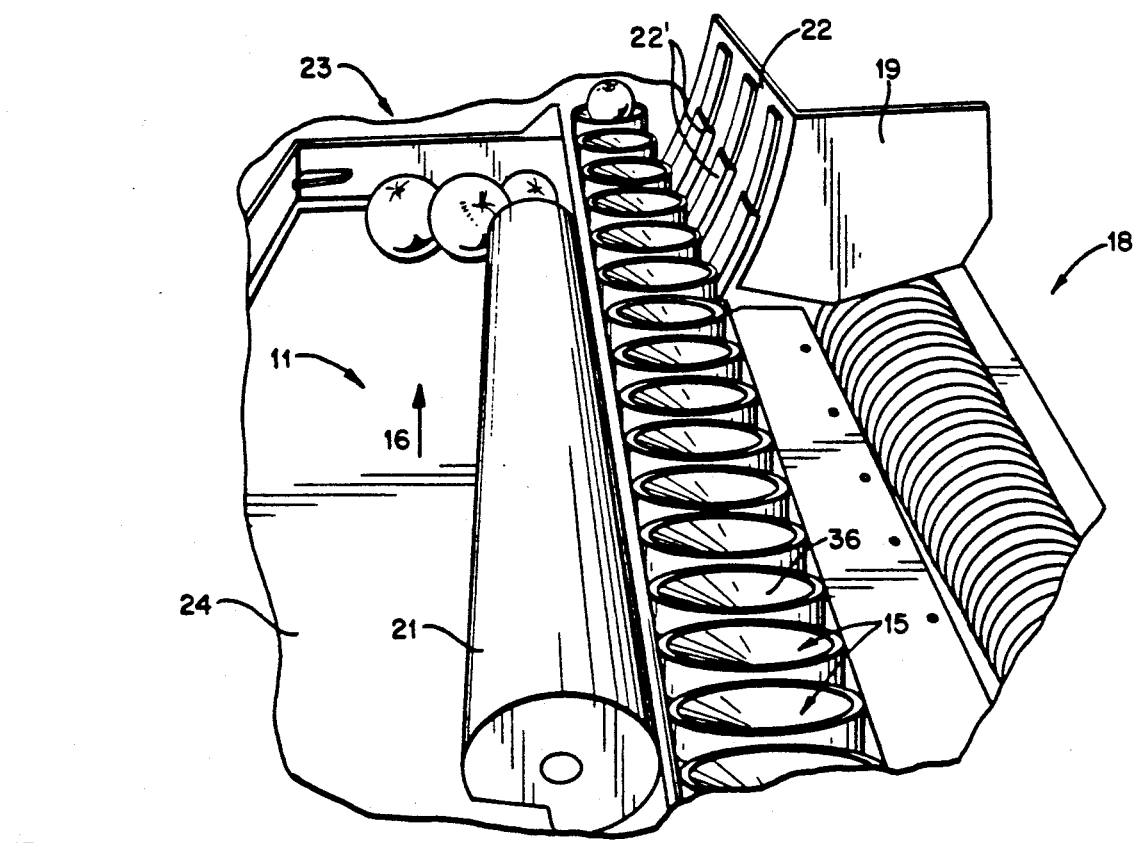
FIG. 1 is a perspective view of an exemplary self-singulating section of an article sorter according to the present invention.

In order to prevent the bruising that can occur when the pieces of fruit are transferred from a singulating section to a weighing section, a self-singulating action is provided. An exemplary self-singulating section is illustrated in detail in FIG. 1. In this particular self-singulating section, a feed conveyor 18, which may include rollers and a brush rotatable about axes parallel to the dimension 16, convey the pieces of fruit toward the cups 15, the fruit being guided on the sides thereof by sidewalls (one sidewall 19 being seen in FIG. 1). Located on the opposite side of the cups 15 from the feed conveyor 18 is a cushioning backstop 21, which may be—as illustrated in FIG. 1—merely a stationary roll of rubber, foam, or like cushioning material. Any articles tending to roll past the cups 15 will impact the backstop 21 and be gently pushed back onto the cups 15. At the end of the self-singulating section 11, and before the cups 15 transport the articles into the weighing section 12, an overflow discharge 23 is provided. A wall 22 prevents articles that have not been singulated into a cup 15 from moving off the cups 15 in that direction (the wall 22 having projections 22' thereon which tend to move the fruit not singulated onto cups 15 to the overflow section 23). At the overflow section 23 the pieces of fruit move onto a surface 24, which preferably is a conveyor which transports the overflow fruit in a dimension opposite the dimension 16, so that it is ultimately recycled to the feed section 18 utilizing any conventional return conveyors or the like.

Utilizing the apparatus 10, the self-singulating action is not dependent upon a side feed of fruit, but rather the fruit also may be fed onto the cups 15 from the end thereof, that is already moving in the dimension 16. End feeding mechanisms per se are known, typically including funnels or funnel-shaped walls which cause the fruit to move—under the influence of gravity, or conveyed by a conveyor—into a generally single file arrangement to be deposited on the cups 15.

The cups 15 and the chain 17 extend continuously throughout the self-singulating, weighing, and discharging sections 11 through 13. Where the section 12 is in fact a weighing section including a load cell (it may be another article property determining section in place of or in addition to a weighing section, such as an article color sensing section), the cups 15 are mounted to the chain 17 with a lost motion in the vertical dimension so that the articles may be accurately weighed while continuously conveyed, and additionally the cups are mounted for pivotal movement with respect to the chain 17 so that discharge can be effected in the discharge section 13. One form of an exemplary cup and interconnection of the cup to the chain is illustrated in FIGS. 2 through 5.

Figure 2:
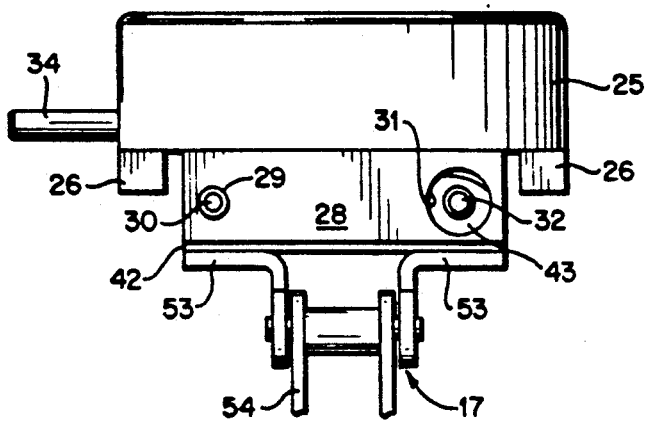
FIG. 2 is an end view of an exemplary discrete article supporting element (cup) mounted on a chain, utilizable in the apparatus according to the invention.

In the embodiment of FIGS. 2 through 5, the article supporting elements 15 comprise a cup body 25 which may be injection molded of plastic, but in the actual embodiment illustrated in FIG. 2 is machined from a solid block of plastic, such as ultra high molecular weight polyethylene. The body 25 includes bosses 26 extending downwardly from the sides thereof. The bosses 26 are adapted to engage rails in the weighing section so as to properly effect weighing. Neither the bosses 26 nor the weighing section are described in detail herein since they are conventional, such as illustrated in U.S. Pat. Nos. 4,660,665, 4,413,690, or 4,262,807, the disclosures of which are hereby incorporated by reference herein.

Also machined from the same block of plastic and integral with the cup body 25 and extending downwardly therefrom are the walls 28. These walls 28 extend generally perpendicular to the dimension 16 when the element 15 is in use. The walls 28 include means defining a first relatively small generally circular opening 29 (see FIG. 2) at one side thereof, for receipt of a pivot pin 30, and means defining a second, much larger, generally circular opening 31 in the other side thereof, which receives the pin 32 with a lost motion connection to allow accurate weighing of the articles transported by the element 15 in the weighing section 12. Note that the pin 32, opening 31, and related structures comprise means for simultaneously mounting said elements 15 for pivotal movement with respect to said chain 17 about the axis defined by pin 32 generally parallel to said dimension of elongation 16, and for mounting said elements 15 for lost motion in the vertical dimension so that said elements may pass over weighing means in section 12 (e.g. load cell 81) and distinctly separate each said element with supported article from the other components of the sorter 10 so that the supported article may be accurately weighed by the weighing means.

Figure 3:
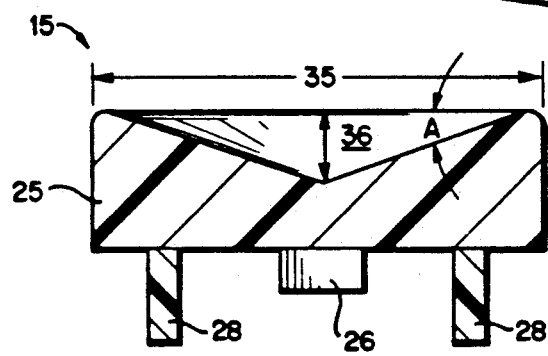
FIG. 3 is a vertical cross-sectional view of the cup of FIG. 2.

A pin 34 also is provided extending outwardly from each cup body 25, the pin having a predetermined thickness (vertical dimension), and extending from the body 25 in a direction generally perpendicular to the dimension 16. As illustrated in FIG. 3, there also is means defining a depression 36 in the top surface of the cup body 25. The dimension 35 of depression 36 typically may be about 3⅜ inches if apples or the like are the articles to be sorted. The depression depth 36 is just deep enough so that the article is positively held in place for property determination (e.g. weighing) and conveyance, but shallow enough so that the cup body 25 need be tilted only a small amount about an axis defined by rod 32 to effect discharge of the article with minimal bruising. For example as illustrated in FIG. 3, the depression 36 is generally conically shaped, with the sidewalls thereof making an angle A of between about 20°–30° with respect to the horizontal. This angle A will be optimized depending upon the article being conveyed, but for apples it is desirably only about 20° or slightly more.

The cup body 25 is connected to the chain 17 by the mechanisms 30, 32, 41, 47, and 53. The structure 41 comprises a plate 42 which has upturned ears 43 on one end thereof with means defining openings 44 in the ears 43, the openings 44 for receipt of the pivot rod 32. The structure 47 merely connects the rods 30, 32. In the embodiment illustrated, the structure 47 merely takes the form of a standard regular polyethylene chain link, having main elongated elements 48 interconnected by cross elements 49, and having means defining openings 50, 52 at the ends thereof for receipt of the rods 30, 32 respectively. The element 47 could take a wide variety of other shapes, the shape illustrated merely being one that is convenient and readily commercially available. The plate 42 is bolted or otherwise connected to the surfaces 53 extending outwardly from the chain 17 (see FIG. 2), the chain 17 itself comprising the links 54 which are interconnected by pins 55, as is conventional.

While the bosses 26 are preferably utilized in the weighing section to ride over the load cell, if desired pins, like pin 34, may be provided extending from both sides of the cup body 25, for weighing.

Figure 4:
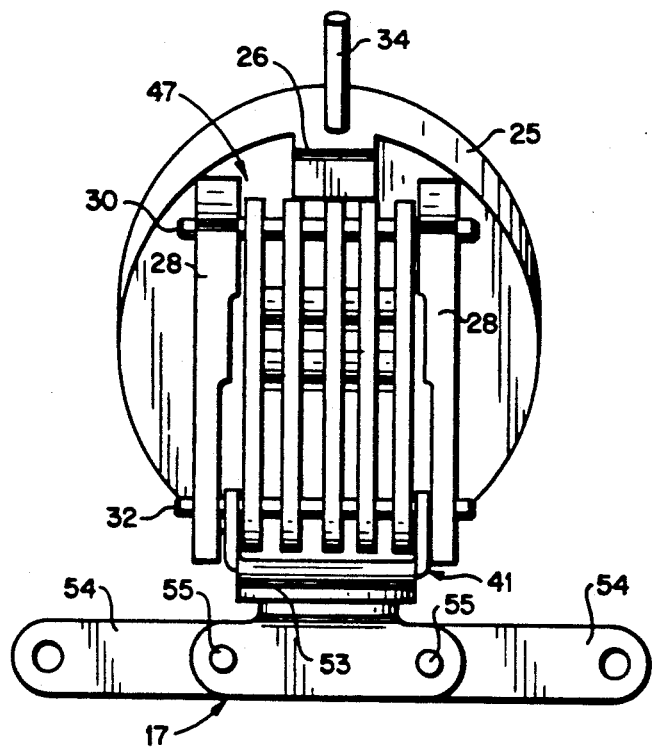
FIG. 4 is a side view of the cup of FIG. 2 shown pivoted about an axis connecting the cup to the chain.
Figure 5:
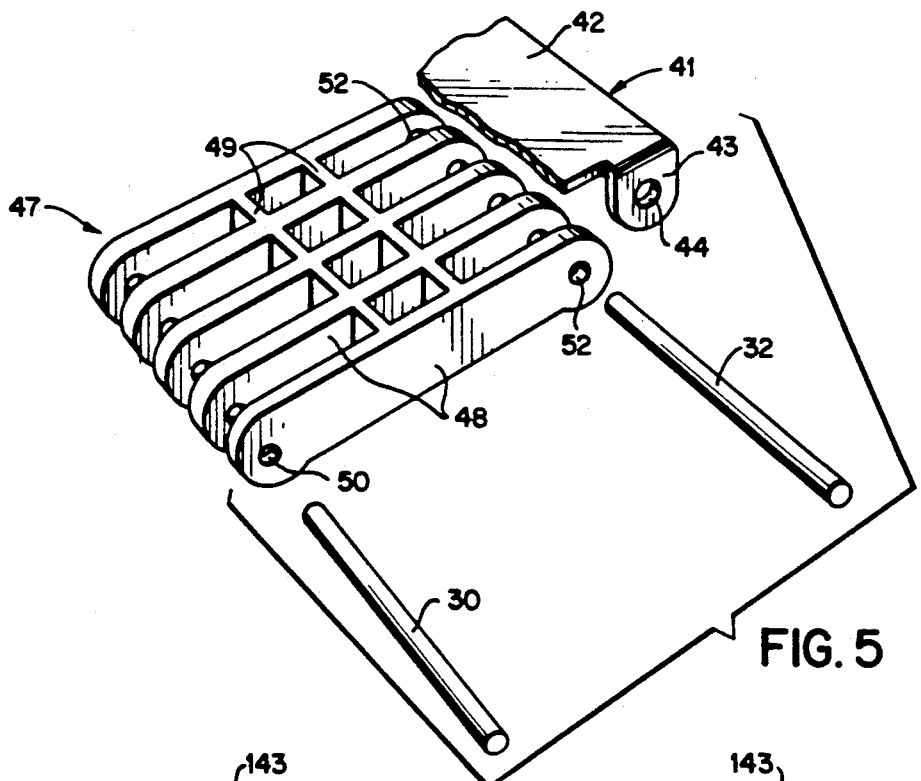
FIG. 5 is a exploded detail view of the mechanisms for interconnecting the cup and chain for the embodiment of FIG. 2.

As seen in FIG. 4, the cup body may be pivoted about an axis defined by the rod 32, the rod 32 extending generally parallel to the dimension 16. If the pin 34 is engaged and moved upwardly, the elements 28, 47 will pivot about the rod 32, while the ears 43 and plate 42 remain stationarily mounted to the chain 17 via surfaces 53.

Figure 6:
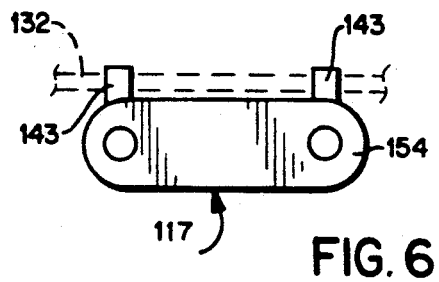
FIGS. 6 and 7 are side and end views respectively of a modified form of chain that the apparatus according to the invention can utilize.
Figure 7:
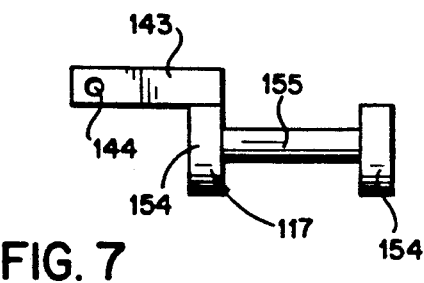

An alternative manner in which the chain can be connected to the cup is illustrated schematically in FIGS. 6 and 7. In this embodiment structures having the same function as in the FIGS. 2 through 4 embodiment are illustrated by the same reference numeral only preceded by a "1". In this embodiment, the chain 117 includes standard links with standard pivot pin connections 155 therebetween, with bars 143 welded to one of the links 154 of selected sections of the chain and extending outwardly therefrom in a dimension perpendicular to the dimension 16. The bars 143 have means defining openings 144 therein for receipt of the pivot rod 132.

Note that in both the embodiment of FIGS. 2 through 5, and the embodiment of FIGS. 6 and 7, the pivot surfaces for the cup are isolated from the articles being conveyed. This is particularly important where the articles are fruit, such as apples, to which a wax is typically applied during handling, insuring that there will be no wax buildup on the pivot surfaces which can ultimately can cause the pivotal action to be less responsive than desirable, and require cleaning (as in the cup constructions as illustrated in U.S. Pat. Nos. 4,660,665 and 4,262,807).

Figure 8:
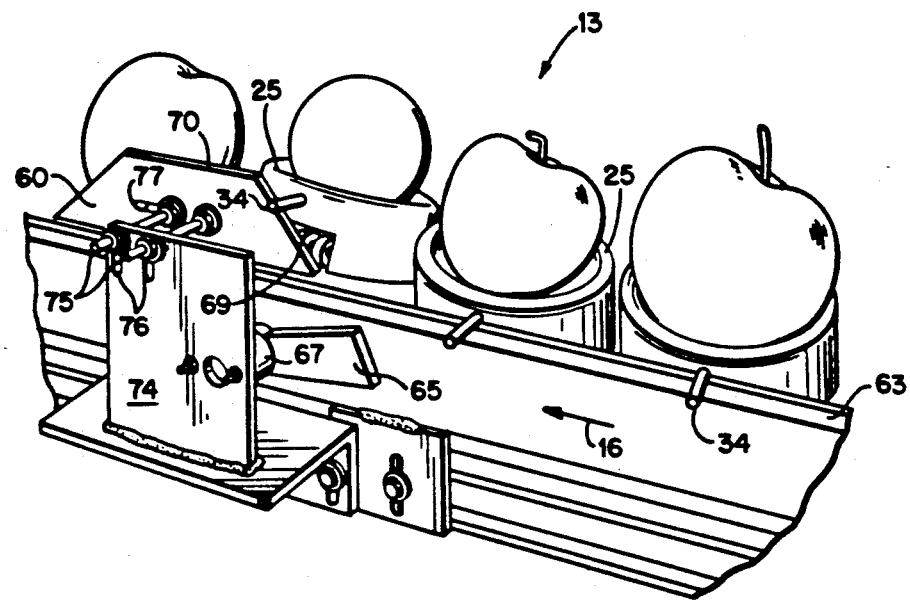
FIG. 8 is a perspective view of an exemplary discharge section of the apparatus according to the invention.
Figure 9:
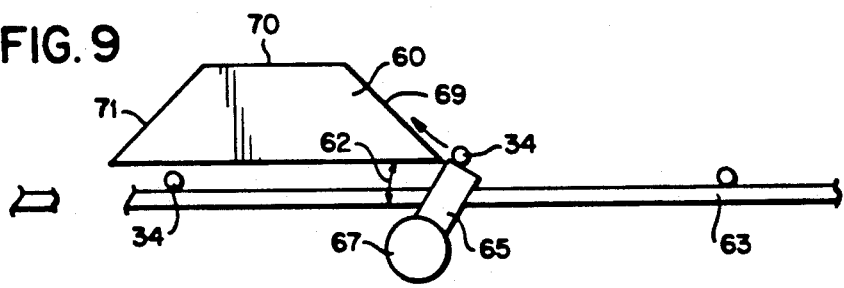
FIGS. 9 and 10 are side views of the exemplary discharge section of FIG. 8 illustrating deflection of a cup to ride up the stationary cam, or passage of the cup past the cam, respectively.
Figure 10:
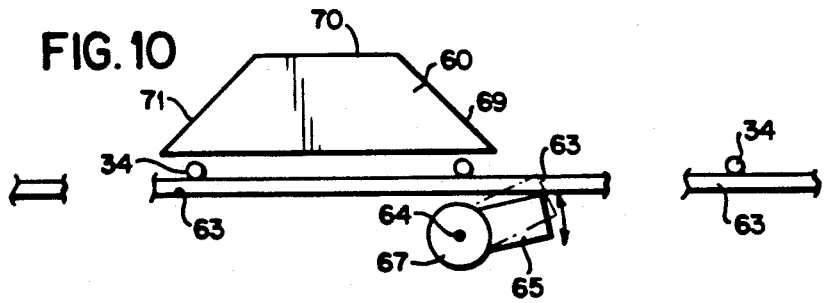

An exemplary discharge section 13 is illustrated in FIGS. 8 through 10. In this section, as in the weighing section 12, the chain 17 and article supporting elements 15 are continuous, so that there is no opportunity for bruising of the articles as they move from one section to the other. In the discharge section 13, the articles are discharged in a dimension which is generally perpendicular to the dimension of conveyance 16.

In the section 13 at a plurality of positions spaced therealong, stationary cams 60 are provided. The cams 60 cooperate with a rail 63, which the pins 34 ride upon. The cam 60 is spaced a vertical distance 62 (see FIG. 9) from the rail 63 which is slightly greater than the thickness (vertical dimension) of the pins 34 so that the pins 34 may either move underneath the cam 60, or be deflected onto the cam 60. Means are provided for selectively deflecting the pins 34 onto the cam 60, in the embodiment illustrated in FIGS. 8 through 10 such means taking the form of an arm 65 connected to a rotary solenoid 67. When the solenoid 67 is activated, it engages the pin 34 and causes the pin 34 to ride up it onto the upwardly angled surface 69 of the cam 60. By the time the pin 34 has reached the flat top surface 70 of the cam 60, the cup body 25 attached to the pin 34 has been pivoted a sufficient amount about the axis 32 so as to have effected discharge of the article (e.g. apple) therefrom. The pin 34, for the now empty cup, then rides back down the downwardly sloping surface 71 of the stationary cam 60 until it again engages the rail 63.

While the cam 60 is stationary, its position can be adjusted depending upon the articles being conveyed, etc. Adjustment may be provided by the mounting mechanisms 74, 75, and 76 illustrated in FIG. 8. Upstanding plate 74 is stationary with respect to the rail 63, and horizontally spaced therefrom, and mounts the rotary solenoid 67, as well as the bolts 75. Bolts 75 are received in vertically elongated openings 76 in the plate 74, and received in horizontally elongated openings 77 in the cam 70 (see FIG. 8) so that both the vertical and horizontal position of the upwardly inclined cam surface 69 may be adjusted.

FIG. 11 illustrates another embodiment of the deflecting means in the discharge section. In the FIG. 11 embodiment, structures having the same function as those illustrated in the FIGS. 8 through 10 embodiment are indicated by the same reference numeral only preceded by a "1". The only significant difference between this embodiment and the FIGS. 8 through 10 embodiment is that an electromagnet 165 is positioned close to the intersection between the rail 163 and an extension of the upwardly extending cam surface 169 of the stationary cam 160. As a pin 134 moves toward the electromagnet 165, if the weight or other property of the article carried by the cup associated with the pin 134 requires that it be discharged at the discharge area associated with the cam 160, the electromagnet 165 is energized, attracting the metal pin 134 toward it so that the pin 134 moves onto the surface 169, after which the current to the electromagnet 165 is cut off until the next cup with an article of desired property approaches it.

A common computer control is provided for the components of the apparatus 10. For example the rotary solenoid 67, the electric motor 80 for moving chain and cups, and the conventional load cell 81 in the weighing section 12, are all interconnected with the computer control 82. Depending upon the weights of the articles sensed in the weighing section 12, they will be discharged at the appropriate one of a plurality of discharge ports in the discharge section 13, and therefore the articles will be sorted by weight, or any other desired property sensed in the section 12.

Because the shallowness of the depression 36 and the fact that the cup body 25 is pivoted about the axis defined by rod 32 (which is parallel to the direction of conveyance 16), minimum bruising of the articles (e.g. apples) will occur in the discharge section 13.

FIG. 13 illustrates another embodiment. In this embodiment components comparable to those in the FIG. 12 embodiment are illustrated by the same reference numeral only preceded by a "1" or "2". In this embodiment, two, or even more, linearly connected groups of sections are provided. For example there is the first self-singulating section 111, the first weighing section 112, and the first discharge section 113. Then, immediately after the discharge section 113, and utilizing the same, continuously extending, cups and conveyor chain, a second self-singulating section 211 is provided, a second weighing section 212, and a second discharge section 213. A common motor 180 is provided for continuously conveying the chain and cups throughout all of the sections 111 through 113 and 211 through 213. A separate load cell 181, 281 is provided in each of the weighing sections, and each of the discharge sections has a plurality of solenoids 167, 267, or the like. A common computer control 182 is provided. In this way, the same elements may be utilized to weight size two (or more) feeds of fruit, which could be the same fruit in each case, or different fruits.

It will be seen that according to the present invention a simple, inexpensive, yet effective apparatus and method have been provided for effecting sorting of bruisable articles with a minimum amount of bruising. By providing self-singulation, shallow depressions in the article supporting elements 15, and discharge perpendicular to the direction of conveyance 16 (so that there is a minimum velocity component in any given direction at the time of discharge), fruit bruising is minimized. Also, the apparatus according to the invention has a number of other advantages compared to conventional weight sizers, such as shown in U.S. Pat. Nos. 4,660,665 and 4,262,807. In particular, the system can be run more quickly, at speeds up to about 10 cups per second, due to the construction of the components and the closer placement of the article supporting elements 15. Also, since the pivot surfaces are isolated from any wax, or the like, that would be applied, less maintenance is necessary and better and more positive discharge can be expected.

Figure 14A:
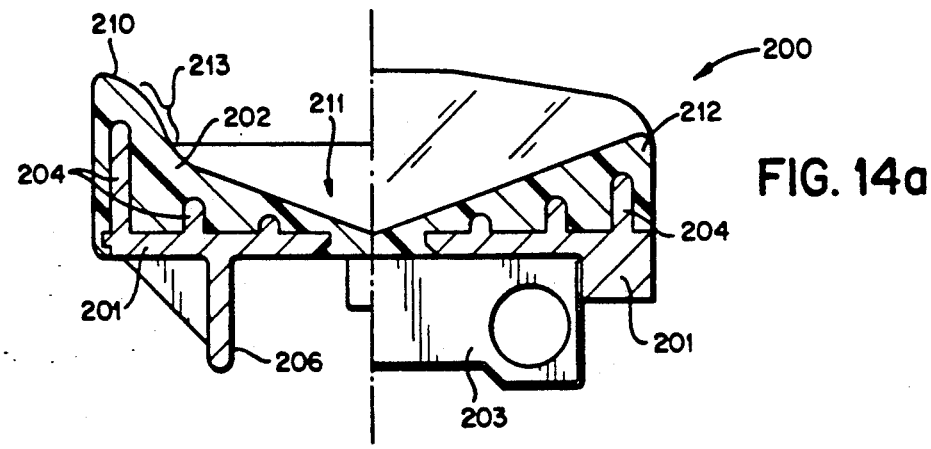
FIGS. 14a and 14b are cross-sectional and side views, respectively, of a two part cup according to the invention.
Figure 14B:
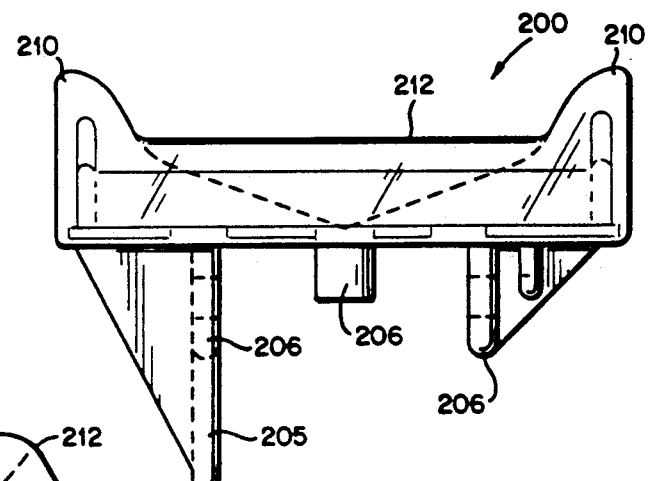
Figure 15:
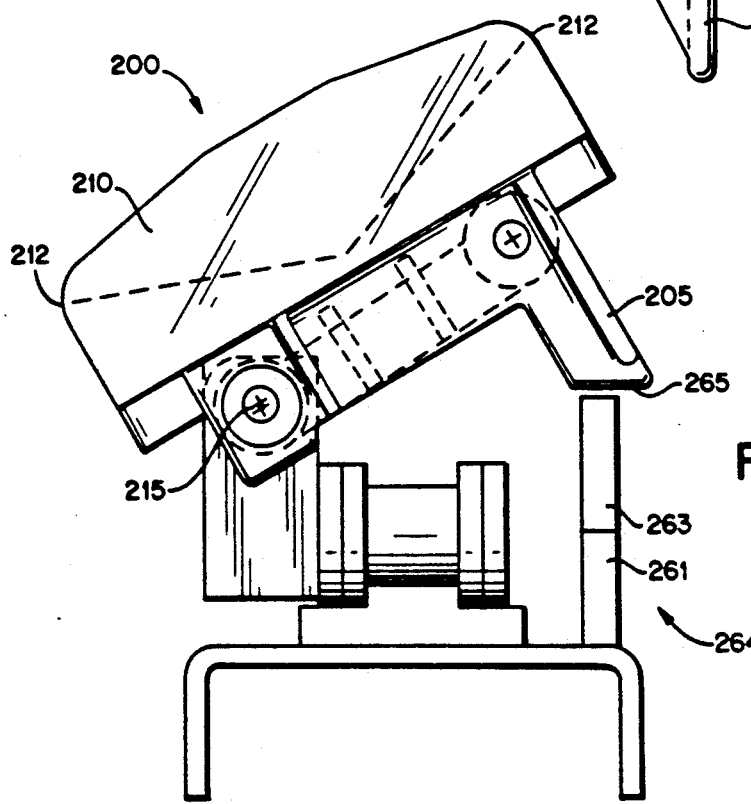
FIG. 15 is a side view of the cup of FIG. 14, in association with the conveyance chain, shown in the discharging position.

FIGS. 14a, 14b and 15 illustrate a modified form of a cup connectable to the transporting chain for holding apples or like discrete, bruisable elements, according to the invention. The cup—shown generally by reference numeral 200—according to this embodiment is less expensive to make, yet even more effective than the cup earlier described.

The cup 200 has a first body, shown generally by reference numeral 201, of a first plastic material which has dimensional stability, and a second body shown generally by reference numeral 202, which need not have dimensional stability and is of less expensive material than the first material, and preferably also softer than the first material. The first body 201 includes means 203, comparable to the means 28 in the FIG. 2 embodiment, for connecting the body 201 to a transporting chain, such as the chain 17, and preferably includes upstanding finger portions 204 of various lengths. Note that in FIG. 14a, the left hand portion of the FIGURE is taken along a cross-section parallel to the direction of movement, while the right hand section is perpendicular to the direction of movement. The first plastic material making up the first body 201 preferably comprises Delrin or UHMW, or the like, i.e., a hard and dimensionally stable plastic. The trip tab 205 extends downwardly from the bottom of the first body 201, to engage a tilting mechanism, and is integral with the body 201. Also various bosses 206 are provided.

The second plastic material forming the body 202 is a material such as EVA, which is significantly less expensive than the first material. Not only is it less expensive, but it is also preferably softer so that it handles the fruit more gently with less chance for bruising. A cup 200, compared to making the same cup all of dimensionally stable plastic (for example, Delrin), is ½ to ⅝ the cost.

The two-piece plastic cup 200 is preferably formed by injection molding the first body in a first mold, removing the body from the first mold and inserting it in the second mold, injection molding in the second mold with the second plastic material to form the second body extending from the first body in a dimension opposite from the connecting portion 203, and removing the formed cup 200 from the second mold. Cooling can be accomplished prior to removal from the second mold, but preferably after it. It is noted that by forming the upstanding fingers 204 of the first body 201 so that they are essentially straight, that a desirable result occurs. After natural warpage of the first body when it cools, the straight portions 204 will have a tendency to warp slightly inwardly to more securely hold the second body 202 thereto.

It is also desirable to form the cup 200 according to the invention so that it retains the piece of fruit held thereby more securely in a direction of conveyance than it does perpendicular thereto (that is, the direction of tilting for discharge). This is accomplished by providing front and rear edges 210 that have a greater length from the bottom of the article holding depression 211 than the length of the side walls 212. Also note that the depression 211 has an angle with respect to the direction of conveyance of about 20°, however that angle increases at the portion 213 above the level of the side walls 212 so that it is about 30°, or even more. In this way the piece of fruit will be positively held in place within the depression 211 as the cup 200 moves in the direction of conveyance (that is, as in the horizontal position illustrated in FIGS. 14a and 14b), however, when the piece of fruit is to be discharged by tilting of the cup 200 about the horizontal axis 215, the piece of fruit may still easily roll out, as illustrated in FIG. 15.

The lost motion interconnection of the cup 200 to the chain and like elements, is identical to that for the cup of FIG. 2 embodiment.

Figure 16:
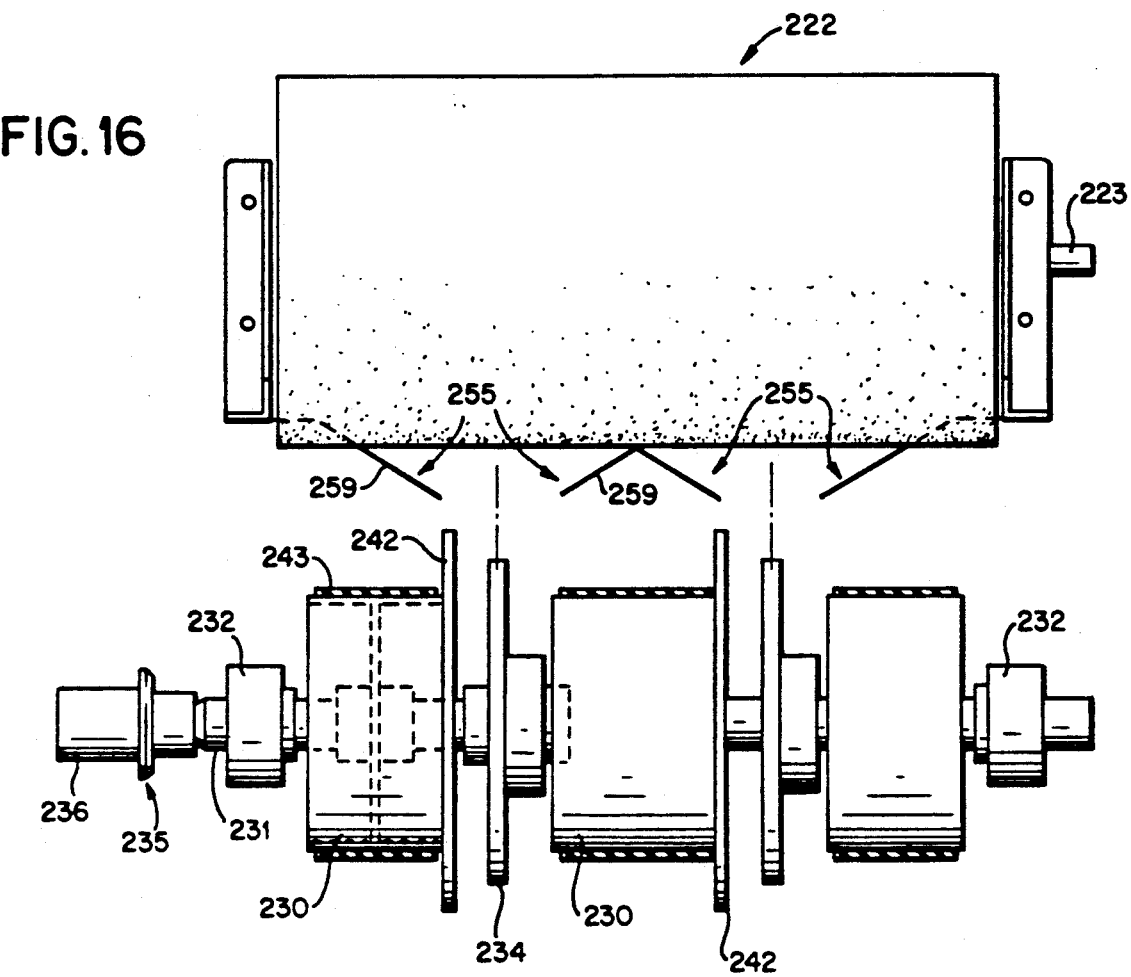
FIG. 16 is an end view of the feed/singulating section of another form of apparatus according to the invention.
Figure 17:
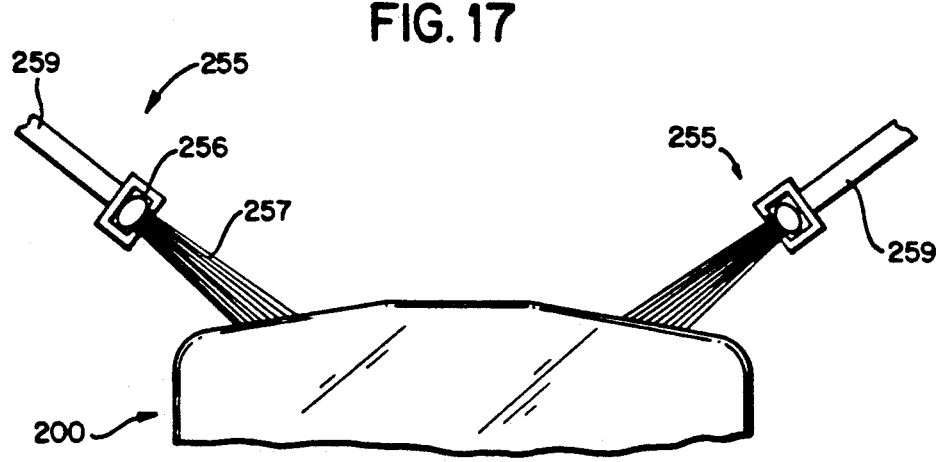
FIG. 17 is a detailed view of brush elements shown in assisting singulating action of the FIG. 16 embodiment.
Figure 18:
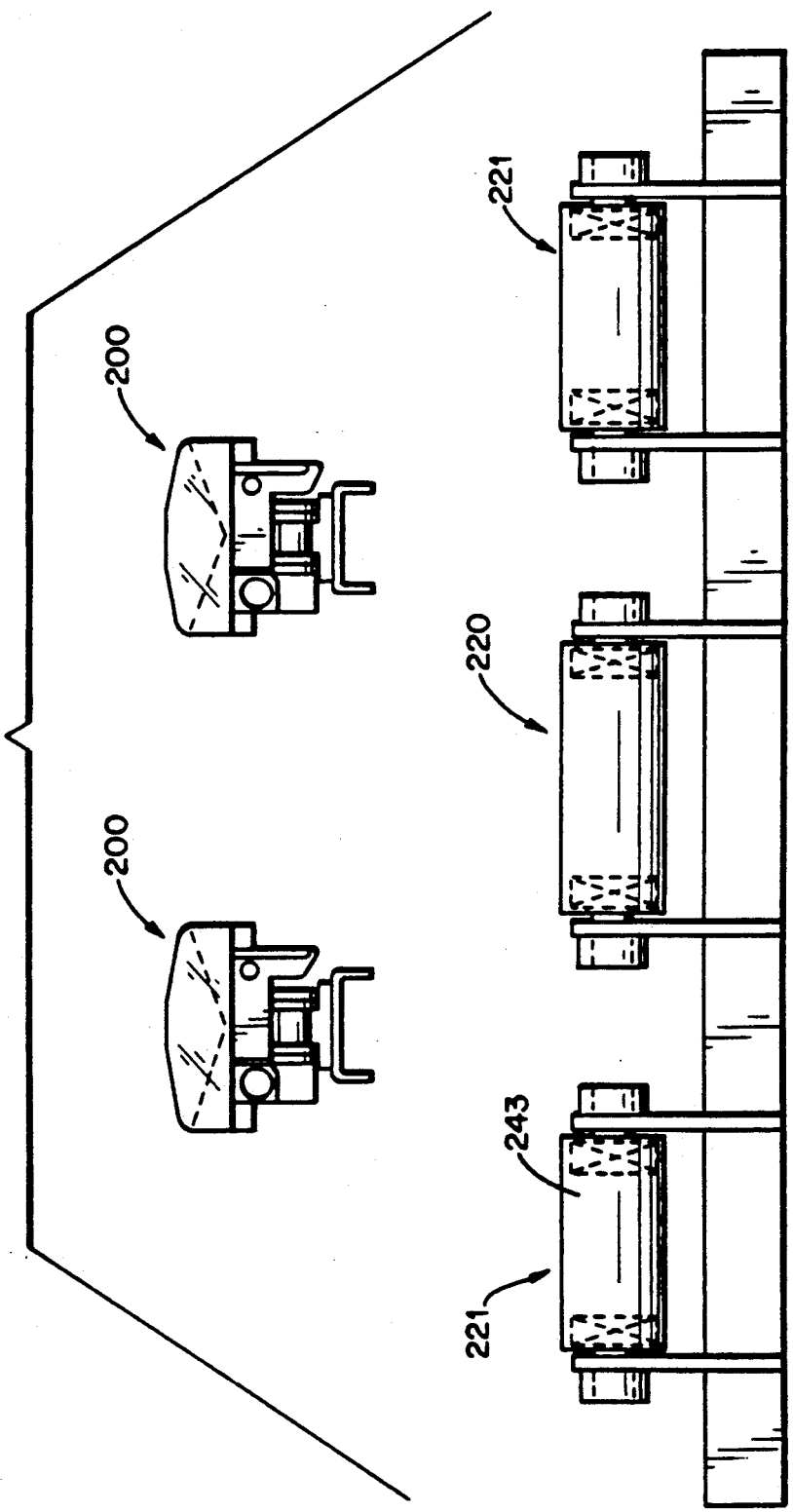
FIG. 18 is an exploded view showing cooperation between conveyance cups and other elements of the embodiment of FIG. 16.
Figure 20:
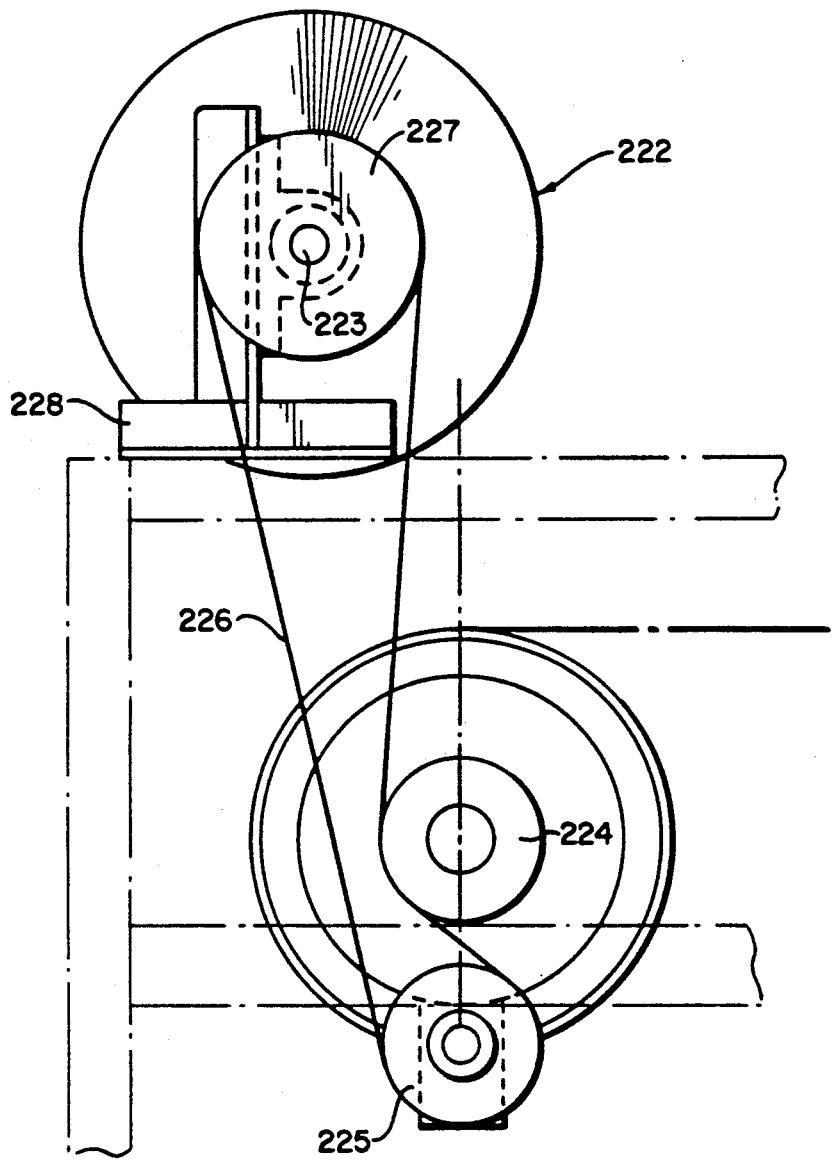
FIG. 20 is a side view showing a mechanism for driving the rotatable brush of the singulating section of the FIG. 16 embodiment.

It is desirable to use multi-lane machines when practicing the present invention. To facilitate this, a different type of singulating section may be utilized than described earlier with respect to the FIG. 1 embodiment. In this embodiment, there are belts between the cups, and at the sides of each cup lane. For example, in a two lane machine, as illustrated in FIGS. 16 and 18, there will be two rows of cups 200 and between the rows of cups will be a conveyor belt assembly 220 and at the ends at the sides of each of the rows cups 200 is a side conveyor belt assembly 221. A rotating conventional large diameter brush 222 is provided at the inlet which slows the velocity of the apples or like discrete bruisable articles being singulated so that they go into the cups 200 more easily. The mechanism for rotating the brush 222 about horizontal axis defined by shaft 223 is illustrated in FIG. 20 comprising a basically conventional drive with the drive sprocket 224 (which drives the cup conveyor chain) cooperating with the idler sprocket 225, chain 226, and sprocket 227 connected to the shaft 223, to rotate the brush 222 in the opposite direction as the direction of conveyance of the cups 200 of the machine. Stationary bracket 228 mounts a bearing (not shown) which receives the shaft 223, a bracket 228 and bearing being provided on either side of the brush 222.

Figure 21:
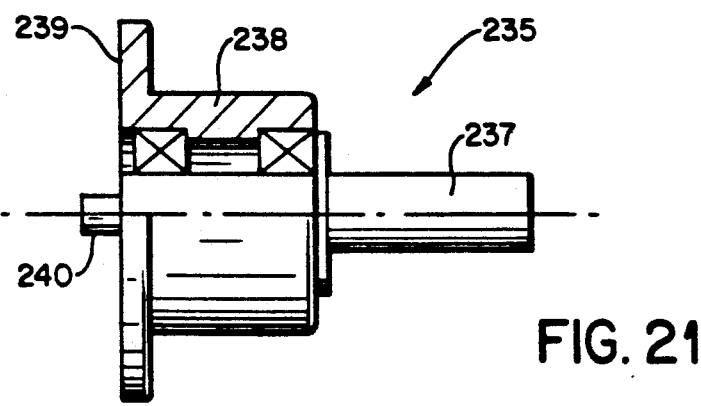
FIG. 21 is a side, detailed view, partly in cross-section and partly in elevation of the encoder mount of the FIG. 16 embodiment device.

The apples are conveyed by conveyor belts supported by drums 230 (see FIG. 16), mounted on a shaft 231 to a stationary frame by bearings 232. The drums 230 preferably are steel or the like, and rotate with the conveyor chain engaging sprockets 234. Also on the shaft 231 is an encoder mount 235, to which is mounted a conventional encoder 236. Encoder mount 235 is illustrated in FIG. 21, and includes a shaft portion 237 which is inserted in an axial bore in the shaft 231, and has a plastic outer drum 238 including a flange portion 239 which abuts a comparable flange portion on the encoder 236. The pin 240 extending from the drum 238 on the opposite side thereof as the shaft portion 237 operatively engages the encoder 236. The encoder housing would typically be connected by screws or the like to the flange 239. By changing the software associated with the system, different conventional encoders 236 could be utilized.

It is desirable to construct the components so that the conveyor belts move at a slightly slower speed than the chains with the conveying cups 200. Since the sprockets 234 which engage the chains, and the drums 230, are on the same tail shaft 231, all that is necessary to effect a speed differential is to make the drums 230 of slightly different size than the sprockets 234. The slightly slower speed of the conveyors belt assemblies 220, 221 and their associated drums 230, starts deceleration before fruit changes direction, so that the fruit is handled more delicately.

Figure 19:
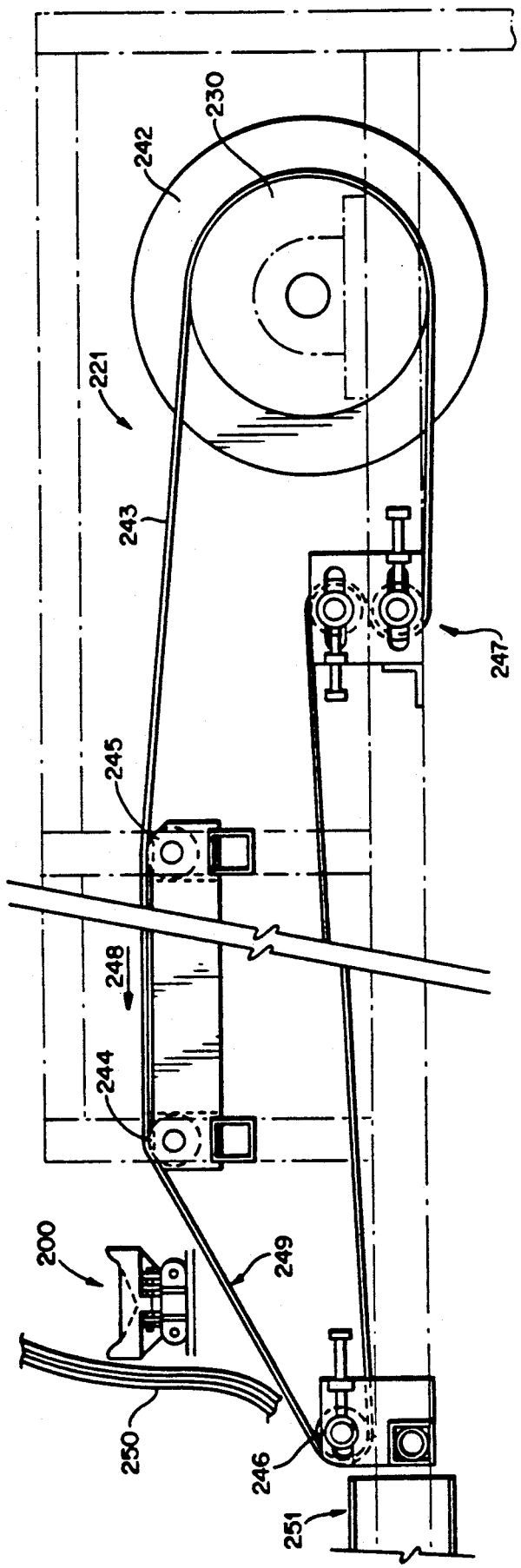
FIG. 19 is a side view of an elevator belt portion of the apparatus of the FIG. 16 embodiment.

Integral with at least two of the drums 230 are rims 242 (FIGS. 16 and 19). These rims engage the bosses (e.g., 206) on the cups 200 during movement around the sprockets 234 to put the cups in horizontal position as soon as they reach the top.

FIG. 19 shows a typical construction of a conveyor assembly 220 or 221. The conveyor assembly includes a conveyor belt 243 operatively engaging the drum 230, and various other rollers 244, 245, 246. The general configuration of conveyor assembly 221 is a conventional elevator belt conveyor (except for the drum configuration and attachments), and it includes a tensioning and tracking mechanism 247. The fruit is initially deposited on the belts 243 just past the drums 230 and is conveyed in the direction of the arrow 248 (which is the same direction of movement as the cups 200). Any fruit which is not deposited within a cup 200 by the time the fruit reaches the roller 244 moves downwardly down the inclined portion 249 of the belt 243, is slowed by a drape or drapes 250, and ultimately is deposited on a return conveyor 251 which brings it back to be redeposited adjacent the drum 230.

Mounted between the brush 222 and the inclined portion 249 of the conveyor 221 (and like components of the conveyor 220) are a plurality of strip brush assemblies 255 (see FIGS. 16 and 17) which comprise an important part of the self-singulating section illustrated in FIGS. 16 through 21. The strip brushes are conventional brushes such as sold as a door sealer for refrigerated doors or the like. They comprises an elongated channel 256 having bristles 257 extending outwardly therefrom. The channel 256 typically is aluminum or stainless steel, while the brush bristles 257 are of synthetic material, such as nylon. The channels 256 with mounted brushes 257 can be purchased in a wide variety of lengths and can be cut to size, but typically would provide a guiding section of at least several inches (and preferably feet) along the direction of conveyance 248 of the fruit in the self-singulating section. The unsupported length of the bristles 257 (that is, the length extending outwardly from the channel 256) is typically about ½ inch to 1½ inches, preferably about an inch.

The brushes 255 are mounted by mounting means including the stainless steel, aluminum, or steel sheets 259. The sheets 259 mount the strip brushes 255 so that they are disposed at an angle (e.g., about 45° in FIGS. 16 and 17) with respect to the linear direction and movement 248 of the cups 200 so as to facilitate gentle individual movement of the discrete bruisable articles into the cups 200 in the self-singulating section.

The self-singulating mechanism of FIGS. 16–21 is utilized with the weighing section and discharge sections identical to those earlier described, except that if the cups 200 are utilized, with the integral downwardly extending trip tab 205, then the tilting mechanism will be a ramp at the bottom of the apparatus, rather than the pin and wrap mechanism such as illustrated in FIG. 11. Typical ramp/stationary cam arrangement 264 for engaging and tilting the trip tab 205 is illustrated in FIG. 15, comprising a front portion 261 having a height lower than the bottommost cam engaging portion 262 of the trip tab 205 during its conveyance in the direction 248, with an incline 263 extending upwardly therefrom. The stationary cam, 264 is moved by an electromagnetic or like moving mechanism (not shown), under control of the computer, into the pathway of the trip tab 205 of the cup desired to be discharged at that particular position so that the portion 262 of trip tab 205 engages the ramp 263, and moves up to the top thereof during its normal conveyance and thereby tilts about the axis 215 as illustrated in FIG. 15. Obviously, once the ramp 263 is passed, the cup 200 returns to its normal horizontal position.

Figure 22:
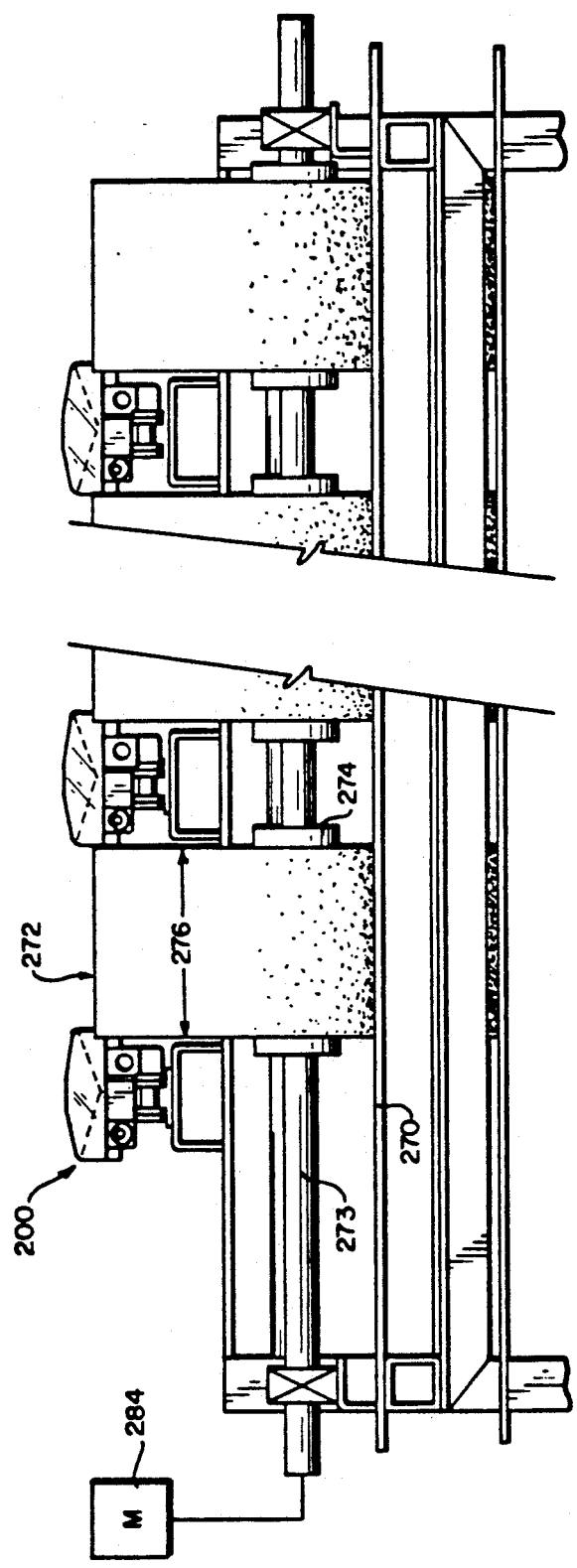
FIG. 22 is a end view showing cooperation between the conveyance cups and the brush for transferring discharged discrete bruisable articles from the cup to another conveyance mechanism.
Figure 24:
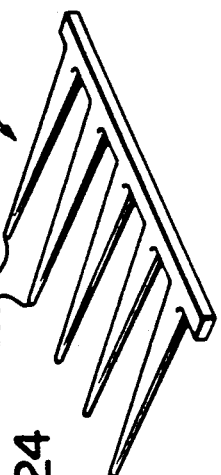
FIG. 24 is a detailed, perspective view of the fingers of FIG. 23 cooperating with the brush thereof.
Figure 23:
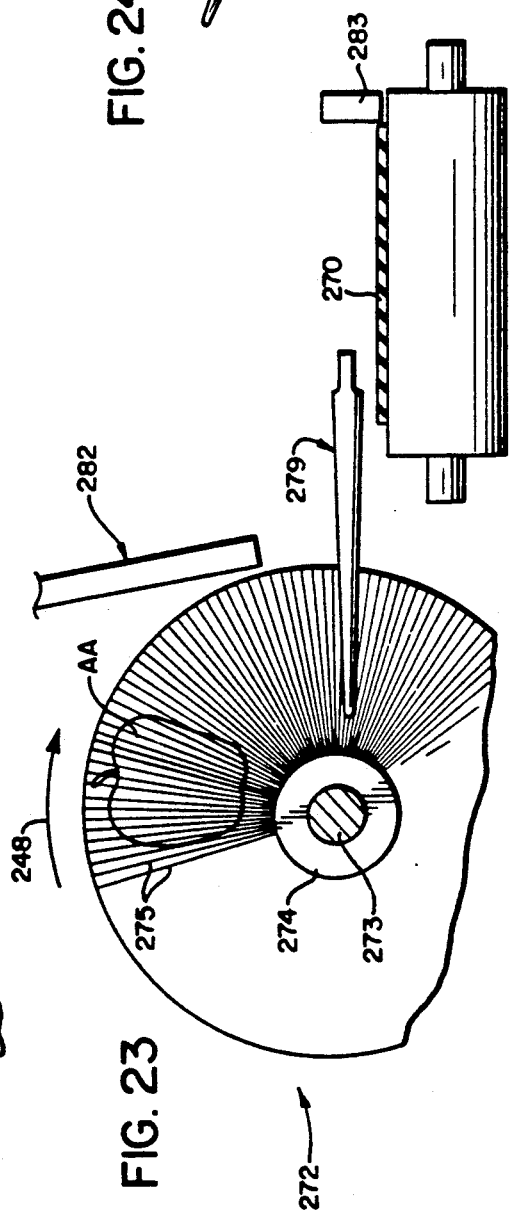
FIG. 23 is a side, detailed view of a brush like that in FIG. 22 with other operative components.

According to the invention, a particularly advantageous and gentle way for handling the discharge of fruit with a minimum of bruising action is illustrated in FIGS. 22–24. The chains and conveyor cups, such as cups 200, at a discharge section comprise a first transporting means for transporting fruit or like bruisable elements in a first direction 248 at a first level. A second transporting means, such as the conventional run-on belt 270 (see FIGS. 22 and 23) transports the fruit in a second direction and/or at a second level, different than the first direction and/or level. Typically, the run-on belt would move in a dimension perpendicular to the dimension of conveyance 248 of the cups 200 and would be a distance below the first level approximately equal to (typically slightly greater than) the radius of a brush 272.

The brush 272 is mounted on a shaft 273, as by a central collar 274 with end caps, for rotation about a horizontal axis perpendicular to direction 248, and has bristles 275 (see FIG. 23) extending radially outwardly from the shaft 273 to a point adjacent the first level (cups 200). The shaft 273 is rotated by a motor 284 or the like so that the brush bristles 275 have a tangential direction of movement adjacent the first level (cups 200) in the first direction of movement 248. The brush 272 gently handles the fruit when it is discharged from the cups 200 by tilting action of the cups (as illustrated in FIG. 15) by the ramps 264 and associated trip tab 205, pivot point 215 and the like.

An exemplary brush 272 according to the invention may be a modified version of a conventional car wash brush. The brush 272 must have a width 276 that is greater than the width of a piece of fruit, or like bruisable element to be held thereby, and it must have a radius/diameter great enough to span the height between the first level (cups 200) and the second level (belt 270). The bristles 275 must be long enough and flexible enough to essentially engulf a piece of fruit that is let down into the brush, and to allow the piece of fruit to penetrate toward the core 274 in a controlled, gentle manner (e.g., not too fast). For example, the bristles 275 typically would have a length of about 4–6 inches (about five inches where apples are being handled), and are made of a synthetic material, such as polyethylene. The overall diameter of the brush 272 is about 12 inches. Frayed ends are conventional for car wash brushes, and while the frayed ends are not necessary, they are desirable since they insure that there are no sharp points which might impale or scratch a piece of fruit.

The apparatus illustrated in FIGS. 22–24 also preferably comprises finger means, shown generally by reference 279 in FIGS. 23 and 24, having a plurality of spaced, generally conical fingers 280, much like the fingers of human hands, which extend into the bristles 275 at approximately the second level (e.g., conveyor 270) for stripping the apples or like bruisable elements (e.g., see apple AA in FIG. 23) from the brush 272, and facilitating deposit thereof on the conveyor 270. A flexible rubber drape 282 (see FIG. 23) is also preferably provided adjacent and just past the brush 272 in the direction 248, so that if an apple AA is particularly light and does not have a tendency to penetrate the bristles 275 and decelerate in movement toward the core 274, it will be pushed toward the core 274 by the drape 282 and will not be thrown out of the brush, but rather will be gently deposited on the finger means 279.

The transfer/discharge mechanism as illustrated in FIGS. 22–24 is very advantageous since it insures minimal velocity of the fruit in the direction of conveyance 248 by the time it reaches the belt 270 in which it will be conveyed in a different direction. Thus, only a small bumper 283 need be provided adjacent the conveyor 270, and few parts in general are necessary. Despite the simplicity of the transfer mechanism of FIGS. 22–24, it very gently handles the fruit and can handle even fruit without diminozide without significant bruising thereof.

It will thus be seen that according to the present invention fruit, and like discrete bruisable articles, may be handled in a gentle manner so that there is minimum bruising thereof, yet the fruit may be effectively singulated, weighed, discharged, etc.

While the invention has been shown in what is presently conceived to be the most practical and preferred embodiment, it will be apparent that many modifications may be made thereof, and the invention is to be accorded the broadest interpretation of the appended claims so as to encompass all equivalent structures and methods.

What is claimed is:

1. A bruisable discrete element transfer mechanism comprising:
   a first transporting means for transporting the bruisable element in a first direction at a first level;
   a second transporting means for transporting the bruisable element in a second direction and second level, different than said first direction and first level;
   a brush having a shaft rotatable about a substantially horizontal axis, and adjacent said first transporting means, and having bristles extending from said shaft positioned adjacent said first level;
   means for rotating said shaft so that said brush bristles have a tangential direction of movement adjacent said first level in said first direction;
   the bruisable element being moved from the first transporting means to the brush so that the bruisable element is substantially engulfed by said brush bristles and moves through said bristles toward said shaft so that said brush transfers the bruisable element from said first transporting means to said second transporting means; and
   said second level disposed below said first level by a distance approximately equal to the radius of said brush.

2. A mechanism as recited in claim 1 wherein said bristles have a length of about 4–6 inches, and are of polyethylene.

3. A mechanism as recited in claim 1 further comprising finger means extending into said brush bristles at approximately said second level, for stripping the bruisable element from said brush and facilitating deposit thereof in operative association with said second transporting means.

4. A mechanism as recited in claim 3 wherein said brush bristles are frayed end polyethylene bristles having a length of about 4–6 inches.

5. A mechanism as recited in claim 1 further comprising a flexible drape positioned adjacent said brush just past said brush axis in said first direction.

6. A mechanism as recited in claim 3 further comprising a flexible drape positioned adjacent said brush just past said brush axis in said first direction.

7. A mechanism as recited in claim 1 wherein said brush bristles are frayed end polyethylene bristles having a length of about 4–6 inches.

8. A bruisable discrete element transfer mechanism comprising:
   a first transporting means for transporting the bruisable element in a first direction at a first level;
   a second transporting means for transporting the bruisable element in a second direction or second level, different than said first direction or level;
   a brush having a shaft rotatable about an axis, and adjacent said first transporting means, and having bristles extending from said shaft positioned adjacent said first level;
   means for rotating said shaft so that said brush bristles have a tangential direction of movement adjacent said first level in said first direction;
   the bruisable element being moved from the first transporting means to the brush so that the bruisable element is substantially engulfed by said brush bristles and moves through said bristles toward said shaft so that said brush transfers the bruisable element from said first transporting means to said second transporting means; and
   finger means extending into said brush bristles at approximately said second level, for stripping the bruisable element from said brush and facilitating deposit thereof in operative association with said second transporting means.

9. A mechanism as recited in claim 8 wherein said axis of rotation of said brush shaft is substantially horizontal, and wherein the bristles have a length of about 4–6 inches.

10. A mechanism as recited in claim 8 further comprising a flexible drape positioned adjacent said brush just past said brush axis in said first direction.

11. A mechanism as recited in claim 8 wherein said brush bristles are frayed end polyethylene bristles having a length of about 4–6 inches.

12. A bruisable discrete element transfer mechanism comprising:
   a first transporting means for transporting the bruisable element in a first direction at a first level;
   a second transporting means for transporting the bruisable element in a second direction or second level, different than said first direction or level;
   a brush having a shaft rotatable about an axis, and adjacent said first transporting means, and having frayed end polyethylene bristles about 4–6 inches long, and extending radially outwardly from said shaft positioned adjacent said first level; and
   means for rotating said shaft so that said brush bristles have a tangential direction of movement adjacent said first level in said first direction;
   the bruisable element being moved from the first transporting means to the brush so that the bruisable element is substantially engulfed by said brush bristles and moves through said bristles toward said shaft so that said brush transfers the bruisable element from said first transporting means to said second transporting means.

13. A mechanism as recited in claim 12 wherein said axis of rotation of said brush shaft is substantially horizontal, and wherein said second direction and level are both different than said first direction and level, and said second level is below said first level by a distance approximately equal to the radius of said brush.

14. A mechanism as recited in claim 12 further comprising finger means extending into said brush bristles at approximately said second level, for stripping the bruisable element from aid brush and facilitating deposit thereof in operative association with said second transporting means.

15. A mechanism as recited in claim 12 further comprising a flexible drape positioned adjacent said brush just past said brush axis in said first direction.

16. A bruisable discrete element transfer mechanism comprising:
a first transporting means for transporting the bruisable element in a first direction at a first level;
a second transporting means for transporting the bruisable element in a second direction or second level, different than said first direction or level;
a brush having a shaft rotatable about an axis, and adjacent said first transporting means, and having bristles extending from said shaft positioned adjacent said first level;
means for rotating said shaft so that said brush bristles have a tangential direction of movement adjacent said first level in said first direction;
the bruisable element being moved from the first transporting means to the brush so that the bruisable element is substantially engulfed by said brush bristles and moves through said bristles toward said shaft so that said brush transfers the bruisable element from said first transporting means to said second transporting means; and
a flexible drape positioned just past said brush axis of rotation in said first direction for engaging lightweight bruisable elements to move them toward the shaft of said brush.

17. A mechanism as recited in claim 16 wherein said brush bristles are frayed end polyethylene bristles having a length of about 4–6 inches.

* * * * *